United States Patent
Shimizu

(10) Patent No.: US 8,899,840 B2
(45) Date of Patent: Dec. 2, 2014

(54) TAPERED ROLLER BEARING

(75) Inventor: Yasuhiro Shimizu, Kuwana (JP)

(73) Assignee: NTN Corporation, Osaka (JP)

( * ) Notice: Subject to any disclaimer, the term of this patent is extended or adjusted under 35 U.S.C. 154(b) by 20 days.

(21) Appl. No.: 13/704,645

(22) PCT Filed: Jun. 23, 2011

(86) PCT No.: PCT/JP2011/064382
§ 371 (c)(1),
(2), (4) Date: Dec. 17, 2012

(87) PCT Pub. No.: WO2012/002247
PCT Pub. Date: Jan. 5, 2012

(65) Prior Publication Data
US 2013/0089285 A1    Apr. 11, 2013

(30) Foreign Application Priority Data
Jun. 30, 2010    (JP) .................. 2010-149302

(51) Int. Cl.
*F16C 33/48* (2006.01)
*F16C 33/58* (2006.01)
*F16C 43/04* (2006.01)
*F16C 33/54* (2006.01)
*F16C 19/36* (2006.01)
*F16C 43/08* (2006.01)

(52) U.S. Cl.
CPC ............. *F16C 33/543* (2013.01); *F16C 19/364* (2013.01); *F16C 33/58* (2013.01); *F16C 43/08* (2013.01)
USPC ........................... 384/572; 384/565; 384/584

(58) Field of Classification Search
USPC ......................................... 384/565, 572, 584
See application file for complete search history.

(56) References Cited

U.S. PATENT DOCUMENTS

| 5,921,685 A | * | 7/1999 | Ishimaru et al. ............... 384/564 |
| 6,135,643 A | * | 10/2000 | Hattori et al. .................. 384/589 |

(Continued)

FOREIGN PATENT DOCUMENTS

| JP | 46-25202 | 7/1971 |
| JP | 58-130120 | 9/1983 |

(Continued)

OTHER PUBLICATIONS

International Search Report issued Sep. 6, 2011 in International (PCT) Application No. PCT/JP2011/064382.

(Continued)

*Primary Examiner* — James Pilkington
(74) *Attorney, Agent, or Firm* — Wenderoth, Lind & Ponack, LLP.

(57) ABSTRACT

A roller inscribed circle R1 diameter of tapered rollers fitted in pockets of a bearing retainer is such that a circle R1 portion protruding radially outwardly of an inner race small flange radially outer surface when the rollers are at radially outermost positions in pockets with an outer race unmounted, and when the circle R1 is offset from a raceway circle center of an inner race raceway end at the flange so as to point contact the raceway circle. The circle R1 portion which does not radially outwardly protrude from the flange outer surface has a central angle >180° and ≤240°. Flange thickness is such that when the roller inscribed circle is offset from the raceway circle center to point contact the raceway circle, and swung about the contact point toward the flange, the flange does not interfere with the arcuate locus of the roller inscribed circle swing end.

7 Claims, 8 Drawing Sheets

(56) References Cited

U.S. PATENT DOCUMENTS

| | | | |
|---|---|---|---|
| 7,645,074 B2* | 1/2010 | Chiba et al. | 384/571 |
| 7,722,257 B2* | 5/2010 | Tabata et al. | 384/571 |
| 2006/0045403 A1* | 3/2006 | Tsujimoto | 384/572 |
| 2007/0047865 A1* | 3/2007 | Nakamizo et al. | 384/571 |
| 2009/0003745 A1* | 1/2009 | Tsujimoto | 384/450 |
| 2009/0016664 A1* | 1/2009 | Tsujimoto | 384/576 |
| 2010/0322547 A1* | 12/2010 | Matsushita et al. | 384/548 |

FOREIGN PATENT DOCUMENTS

| | | |
|---|---|---|
| JP | 2001-050281 | 2/2001 |
| JP | 2001-140900 | 5/2001 |

OTHER PUBLICATIONS

Written Opinion of the International Searching Authority issued Sep. 6, 2011 in International (PCT) Application No. PCT/JP2011/064382 (with English translation).

* cited by examiner

TAPERED ROLLER BEARING

BACKGROUND OF THE INVENTION

1. Technical Field

This invention relates to a tapered roller bearing which can be assembled without the need for the steps of bottom expanding of the retainer and caulking of the retainer.

2. Background Art

A typical tapered roller bearing includes an inner race having a tapered raceway on its outer periphery, an outer race having a tapered raceway on its inner periphery, a plurality of tapered rollers disposed between the raceways of the inner and outer races so as to be circumferentially spaced apart from each other, and a retainer keeping the tapered rollers spaced apart from each other.

Retainers used in this type of tapered roller bearing include resin retainers, which are frequently used in bearings for automobiles, and pin type retainers (which are in the form of a plurality of pins inserted through holes formed in the respective tapered rollers to retain the tapered rollers), which are used in extra-large bearings used to support e.g. spindles of windmill generators. But other than these retainers, most retainers used in tapered roller bearings are in the form of iron plates.

JP Patent Publication 2001-50281A discloses an iron plate retainer. This iron plate retainer is a conical member located radially outwardly of a pitch circle that passes through centers of the respective tapered rollers and having a plurality of circumferentially spaced apart pockets in which the respective tapered rollers are received. The pockets are all identical in shape. The tapered rollers are all identically shaped too. The inner race has a large flange at the large-diameter end of its raceway which supports axial loads that act on the tapered rollers, and a small flange at the small-diameter end of its raceway which prevents separation of the tapered rollers from the inner race.

The separately prepared retainer, tapered rollers, inner race and outer race are assembled into the tapered roller bearing of JP Patent Publication 2001-50281A in the following manner. The tapered rollers are inserted into the respective pockets of the retainer from radially inside of the retainer. Since the pockets are narrower than the diameter of the tapered rollers, once fitted in the pockets, the tapered rollers are retained in the pockets without radially outwardly separating from the retainer.

The inner race is then axially inserted into the retainer. If, in this state, the roller inscribed circle of the tapered rollers fitted in the retainer is smaller in diameter than the outer diameter of the small flange of the inner race, the small flange of the inner ring interferes with at least one of the tapered rollers, making it impossible to insert the inner race into the retainer. Thus, in order to prevent the small flange of the inner race from interfering with at least one of the tapered rollers, it is necessary to radially expand the small-diameter end of the retainer beforehand.

In particular, using a presser and bottom expanding die, the small-diameter end portion of the retainer is plastically deformed radially outwardly (this step is hereinafter referred to as "bottom expansion") such that when the tapered rollers are fitted in the retainer, the roller inscribed circle has a larger diameter than the outer diameter of the small flange of the inner race.

The tapered rollers are fitted in, and then the inner race is inserted into, the thus bottom-expanded retainer. Then, using the presser and a caulking die, the small-diameter end portion of the retainer is plastically deformed radially inwardly until the retainer returns to its original shape, i.e. until the diameter of the roller inscribed circle of the tapered rollers becomes smaller than the outer diameter of the small flange of the inner race (this step is hereinafter referred to as "caulking"). Thus after caulking, the inner race cannot slip out of the retainer. Thus, the subassembly of the inner race, tapered rollers and retainer are complete, in which the respective components are securely coupled together. As a final step, this assembly is fitted in the outer race to complete the tapered roller bearing.

It is necessary to prepare plural different bottom expanding dies and caulking dies for retainers having different model numbers and thus having different diameters and/or different number of pockets. This has been a major cause of increased manufacturing cost of conventional tapered roller bearings.

In order to bottom-expand a retainer of a different model number, it is necessary to change the bottom expanding die set in the presser to a new one and adjust it. In order to caulk a retainer of a different model number too, it is necessary to change the caulking die set in the presser to a new one and adjust it. A long time is needed for such die change and adjustment. Before caulking a retainer of a different model number, it is necessary to set the bottom dead center of the presser using an extra retainer. This extra retainer cannot be used in an actual bearing.

If the retainer, tapered rollers and inner race are configured such that when the tapered rollers are fitted in the retainer, the roller inscribed circle has a diameter equal to or smaller than the outer diameter of the small flange, it is possible to omit the bottom expanding and caulking of the retainer. In this arrangement too, once the tapered roller bearing is mounted between a shaft and a housing, the tapered rollers can never move over the small flange of the inner ring, separating from the bearing because the bearing interior space is sufficiently small in this state. But in the state of the subassembly of the inner race, tapered rollers and retainer, the inner race could slip out of the retainer, disintegrating the subassembly.

BRIEF SUMMARY

An object of the present invention is to provide a tapered roller bearing which can be assembled without the need for bottom expansion and caulking of the retainer.

In order to achieve this object, when the tapered rollers are at the radially outermost positions in the respective pockets with the outer race not mounted in position (i.e., not mounted about the tapered rollers), the diameter of the roller inscribed circle of the tapered rollers is determined such that when the roller inscribed circle is offset from the center of a raceway circle of the end of the raceway of the inner race at the small flange so as to contact the raceway circle at one point, the roller inscribed circle has a first angular range that protrudes radially outwardly from the radially outer circle of the small flange, and a second angular range that does not protrude radially outwardly from the radially outer surface of the small flange, wherein the second angular range has a central angle larger than 180° and not larger than 240°. When the tapered rollers are at the radially outermost positions in the respective pockets with the outer race not mounted in position, the roller inscribed circle has a diameter smaller than the outer diameter of the small flange. The small flange of the inner race has such a thickness that when, with the roller inscribed circle offset from the center of the raceway circle so as to contact the raceway circle at the one point, the roller inscribed circle is swung about the one point toward the small flange, the small flange does not interfere with an arcuate locus of a swing end of the roller inscribed circle.

This tapered roller bearing can be assembled from the separately prepared retainer, tapered rollers, inner race and outer race in the following manner.

The tapered rollers are inserted into the respective pockets of the retainer from radially inside of the retainer. The inner race is then inserted into the retainer while being inclined such that a first end of a diameter of the inner race is inserted first and the second end of the diameter is inserted last. After the portion of the small flange of the inner race at the first end of the diameter has passed the roller inscribed circle, the portion of the raceway of the inner race which corresponds to the portion of the small flange that has passed the roller inscribed circle is brought into contact with the corresponding tapered roller. The inner race is then swung about the contact point such that the inner race is pushed into the retainer until the entire small flange passes the roller inscribed circle. This completes a subassembly of the inner race, tapered rollers and retainer. As a final step, the outer race 2 is fitted on the subassembly 20 to complete the tapered roller bearing.

Since the small flange of the inner race has such a thickness that when, with the roller inscribed circle offset from the center of the raceway circle of the end of the raceway of the inner race at the small flange so as to contact the raceway circle at one point (B), the roller inscribed circle is swung about the one point toward the small flange, the small flange does not interfere with an arcuate locus of a swing end of the roller inscribed circle, when the inner race is swung to push the inner race into the retainer, the swing end of the small flange of the inner race never interferes with any tapered roller.

Since the diameter of the roller inscribed circle is determined such that when the roller inscribed circle is offset from the center of the raceway circle of the end of the raceway at the small flange so as to contact the raceway circle at one point, the portion of the roller inscribed circle that does not protrude radially outwardly from the outer-diameter surface of the small flange has a central angle of 240° or less, when the inner race is swung to push the inner race into the retainer, the small flange of the inner race never or scarcely interferes with the tapered rollers. This makes it possible to push the inner race into the retainer by elastically deforming the retainer.

Since the diameter of the roller inscribed circle is determined such that the central angle of its portion radially outwardly protruding from the radially outer surface of the small flange is larger than 180° when the roller inscribed circle is offset from the center of the raceway circle of the end of the raceway of the inner race at the small flange so as to contact the raceway circle at one point, once the inner race, the tapered rollers and the retainer are assembled into the subassembly, the inner race is less likely to separate from the retainer. Since the roller inscribed circle is smaller in diameter than the outer-diameter surface of the small flange, it is possible to reliably prevent breakup of the subassembly.

In one preferred arrangement, the tapered rollers comprise first tapered rollers and second tapered rollers, and the plurality of pockets comprise standard pockets in which the respective first tapered rollers are received, and which are configured such that when the first rollers are at the radially outermost positions in the respective standard pockets with the outer race not mounted in position, the first tapered rollers correspond to the roller inscribed circle, and irregularly shaped pockets in which the respective second tapered rollers are received, and which are configured such that when the tapered rollers are at the radially outermost positions in the respective pockets with the outer race not mounted in position, the second tapered rollers are radially outwardly displaced from the first tapered rollers, wherein when the roller inscribed circle is offset from the center of the raceway circle at the small-diameter end of the raceway of the inner race so as to contact the raceway circle at one point, the irregularly shaped pockets are located within angular ranges which are angularly spaced from the one point by 90° or over and where the roller inscribed circle does not radially outwardly protrude from the radially outer surface of the small flange.

With this arrangement, by positioning the retainer such that the irregularly shaped pockets are located within the above-described angular ranges when the inner race is inserted into the retainer, the tapered rollers that could otherwise interfere with the small flange of the inner race can be moved radially outwardly, so that the inner race can be smoothly inserted into the retainer. Once the inner race is inserted in the retainer to form the subassembly, the subassembly is never broken up unless the centers of the retainer and the inner race are displaced in a predetermined direction.

The irregularly shaped pockets may be configured such that a larger gap is defined between the roller guide surfaces of each of the irregularly shaped pockets and the corresponding tapered roller than between the roller guide surfaces of each of the standard pockets and the corresponding tapered roller. Alternatively, the irregularly shaped pockets may be axially longer toward the large-diameter end surface of the tapered roller than the standard pockets.

In another preferred arrangement, when the roller inscribed circle is offset from the center of the raceway circle at the small-diameter end of the raceway of the inner race so as to contact the raceway circle at one point, the radially outer surface of the small flange of the inner race is formed with cutouts extending over arcuate angular ranges which are angularly spaced from the one point (B) by 90° or over and where the roller inscribed circle does not radially outwardly protrude from the radially outer surface of the small flange.

With this arrangement, by positioning the inner race such that the cutouts are located in the above-described angular ranges when the inner race is inserted into the retainer, the portion of the outer periphery of the small flange of the inner race that could otherwise interfere with a tapered roller never interferes with the tapered roller. Thus, the inner race can be smoothly inserted into the retainer. But once the inner race is inserted into the retainer to complete the subassembly of the inner race, retainer and tapered rollers, the subassembly is never broken up unless the centers of the retainer and the inner race are displaced in a predetermined direction.

In a further preferred arrangement, the plurality of tapered rollers comprise standard tapered rollers which are configured to correspond to the roller inscribed circle when the standard tapered rollers are at the radially outermost positions in the respective pockets with the outer race not mounted in position, and irregularly shaped rollers configured such that radially innermost portions of the respective irregularly shaped rollers are radially outwardly displaced from radially innermost portions of the respective standard tapered rollers when the tapered rollers are at the radially outermost positions in the respective pockets with the outer race not mounted in position, wherein when the roller inscribed circle is offset from the center of the raceway circle at the small-diameter end of the raceway of the inner race so as to contact the raceway circle at one point, the irregularly shaped tapered rollers are located within angular ranges which are angularly spaced from the one point by 90° or over and where the roller inscribed circle does not radially outwardly protrude from the radially outer surface of the small flange.

With this arrangement, by positioning the retainer such that the irregularly shaped tapered rollers are located within the above-described angular ranges when the inner race is inserted into the retainer, the radially innermost portions of the tapered rollers that could otherwise interfere with the small flange of the inner race can be moved radially outwardly, so that the inner race can be smoothly inserted into the retainer. Once the inner race is inserted in the retainer to form the subassembly, the subassembly is never broken up unless the centers of the retainer and the inner race are displaced in a predetermined direction.

The irregularly shaped tapered rollers may be formed by chamfering their corners at the small-diameter end surfaces to a greater degree than the corresponding corners of the standard tapered rollers. Otherwise, the irregularly shaped tapered rollers may be each formed with one cutout at one circumferential portion of its corner at the small-diameter end surface, or a plurality of circumferentially spaced apart cutouts on this corner. With the latter arrangement, the radially innermost portions of any of the irregularly shaped tapered rollers cannot move radially outwardly unless the irregularly shaped tapered roller s at a predetermined angular position. This more reliably prevents breakup of the subassembly.

The tapered roller bearing according to this invention can be assembled without the need to radially expand and then caulk the bottom of the retainer, and for which neither a bottom-expanding die nor a caulking die is necessary, which contributes to a reduced manufacturing cost. Since the bottom expanding step and caulking step are dispensed with, the roller guide surfaces of the retainer can be formed with higher dimensional accuracy.

DETAILED DESCRIPTION

Figure 1:
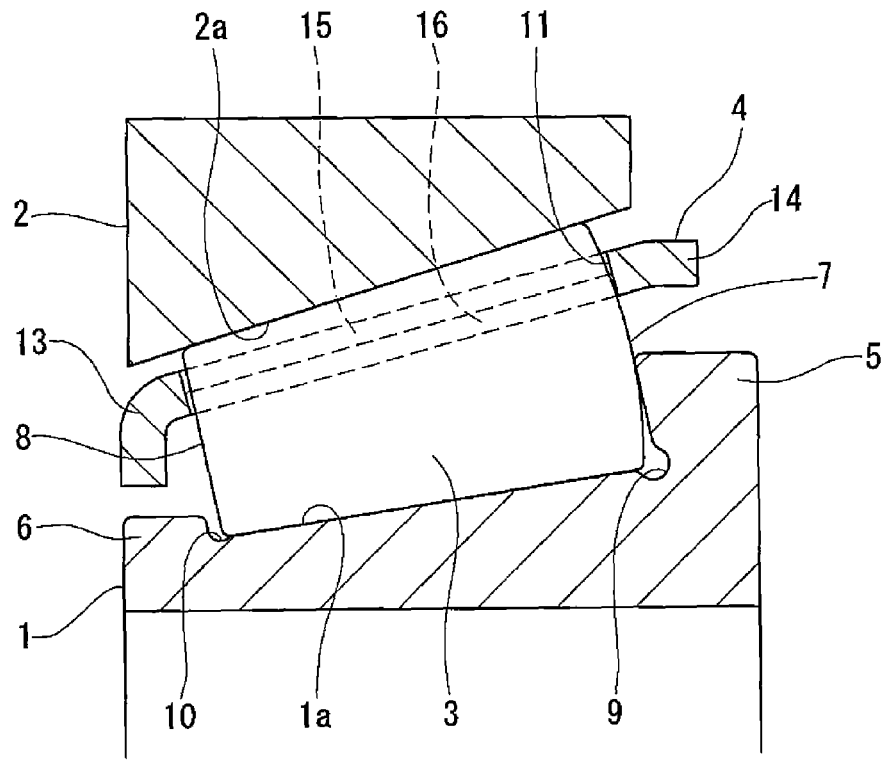
FIG. 1 is a sectional view of a tapered roller bearing of a first embodiment of the present invention, taken along an axial plane of the bearing.

Now referring to FIGS. 1 to 7, the tapered roller bearing of the first embodiment is described. As shown in FIG. 1, this tapered roller bearing includes an inner race 1 formed with a tapered raceway (tapered inner raceway) 1a on its outer periphery, an outer race 2 formed with a tapered raceway (tapered outer raceway) 2a on its inner periphery, a plurality of tapered rollers 3 disposed between the raceways 1a and 2a of the inner race 1 and the outer race 2 so as to be circumferentially spaced apart from each other, and a retainer 4 keeping the tapered rollers 3 spaced apart from each other.

The inner race 1 has a large flange 5 and a small flange 6 at the large-diameter and small-diameter ends of the raceway 1a, respectively. The large flange 5 protrudes radially outwardly from the raceway 1a so as to contact the large-diameter end surfaces 7 of the respective tapered rollers 3. The large flange 5 thus supports axial loads that act on the tapered rollers 3 while the bearing is rotating. The small flange 6 protrudes radially outwardly from the raceway 1a so as to face the small-diameter end surfaces 8 of the respective tapered rollers 3. The small flange 6 restricts axial movements of the tapered rollers 3, thus preventing separation of the tapered rollers 3 from the raceway 1a of the inner race 1.

The large flange 5 and the small flange 6 are formed by machining so as to be integral with the inner race 1. The inner race 1 has relief grooves 9 and 10 at the corner between the large flange 5 and the raceway 1a and at the corner between the small flange 6 and the raceway 1a, respectively. The relief grooves 9 and 10 prevent unground portions left at the respective corners after finish-grinding the raceway 1a.

The retainer 4 is a conical iron plate located radially outwardly of any pitch circle P which passes through the centers of the respective tapered rollers 3. The retainer 4 is formed with a plurality of circumferentially spaced apart pockets 11 in which the respective tapered rollers 3 are received. Each pocket 11 has a trapezoidal section which is slightly larger than the section of the tapered roller taken along a plane passing through the retainer 4. The pockets 11 have a width smaller than the diameter of the tapered rollers 3 to prevent the tapered rollers 3 from separating radially outward from the retainer 4.

Figure 2:
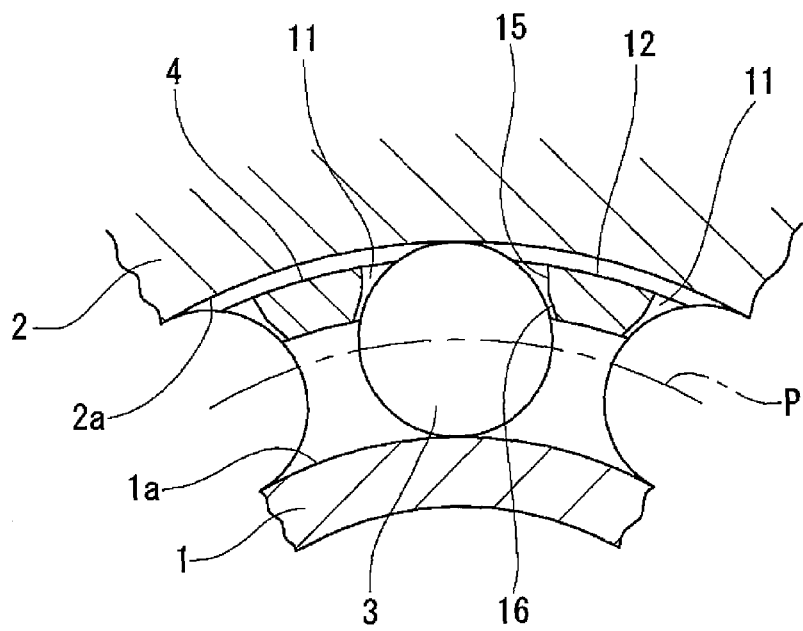
FIG. 2 is a sectional view of the tapered roller bearing of FIG. 1, taken along a radial plane of the bearing.

As shown in FIGS. 1 and 2, the retainer 4 includes a plurality of crossbars 12 partitioning the circumferentially adjacent pockets 11, a small annular portion 13 coupling the crossbars 12 together at their ends near the small-diameter end surfaces 8 of the tapered rollers 3, and a large annular portion 14 coupling the crossbars 12 together at their ends near the large-diameter end surfaces 7 of the tapered rollers 3. The crossbars 12 extend straight from the small annular portion 13 to the large annular portion 14.

As shown in FIG. 2, the side surfaces of the crossbars 12 each include a pocket surface 15 formed when punching the pocket 11, and roller guide surface 16 located radially inwardly of the pocket surface 15. The pocket surfaces 15 are cut surfaces formed when forming the pockets 11 by punching a cylindrical retainer blank. The circumferential distance between each pair of pocket surfaces 15 that face each other on both sides of the tapered roller 3 is constant in the radial direction of the retainer 4.

The roller guide surfaces 16 are formed at the corners between the cut surfaces formed when punching the pockets 11 and the inner peripheral surface of the retainer blank by transfer pressing. The "transfer pressing" herein used is a kind of forging in which with a crossbar 12 set in a V-groove formed in a die (not shown), a punch (not shown) is pressed against the crossbar 12 to transfer the shape of the V-groove to the portions of the crossbar 12 that are in contact with the die.

The roller guide surfaces 16 are inclined relative to the respective pockets surfaces 15 such that the circumferential distance between each pair of roller guide surfaces 16 that face each other on both sides of the tapered roller 3 increases in the radially inward direction of the retainer 4. A minute gap is defined between each opposed pair of roller guide surfaces 16 and the tapered roller 3 to allow rotation of the roller 3. While the bearing is rotating, the roller guide surfaces 16 are kept in contact with the respective tapered rollers 3 along their entire generating lines, thus guiding the tapered rollers 3.

The roller guide surfaces 16 may be completely flat surfaces, but are preferably convex surfaces whose height gradually increases from the axial ends toward the axial center thereof such that the maximum height is about 20 to 50 µm. With this arrangement, even if some of the roller guide surfaces 16 are undulated due to manufacturing errors, the tapered rollers 3 can be guided by the roller guide surfaces 16 over the entire axial lengths of the surfaces 16, which in turn ensures stable contact between the tapered rollers 3 and the roller guide surfaces 16.

Figure 3:
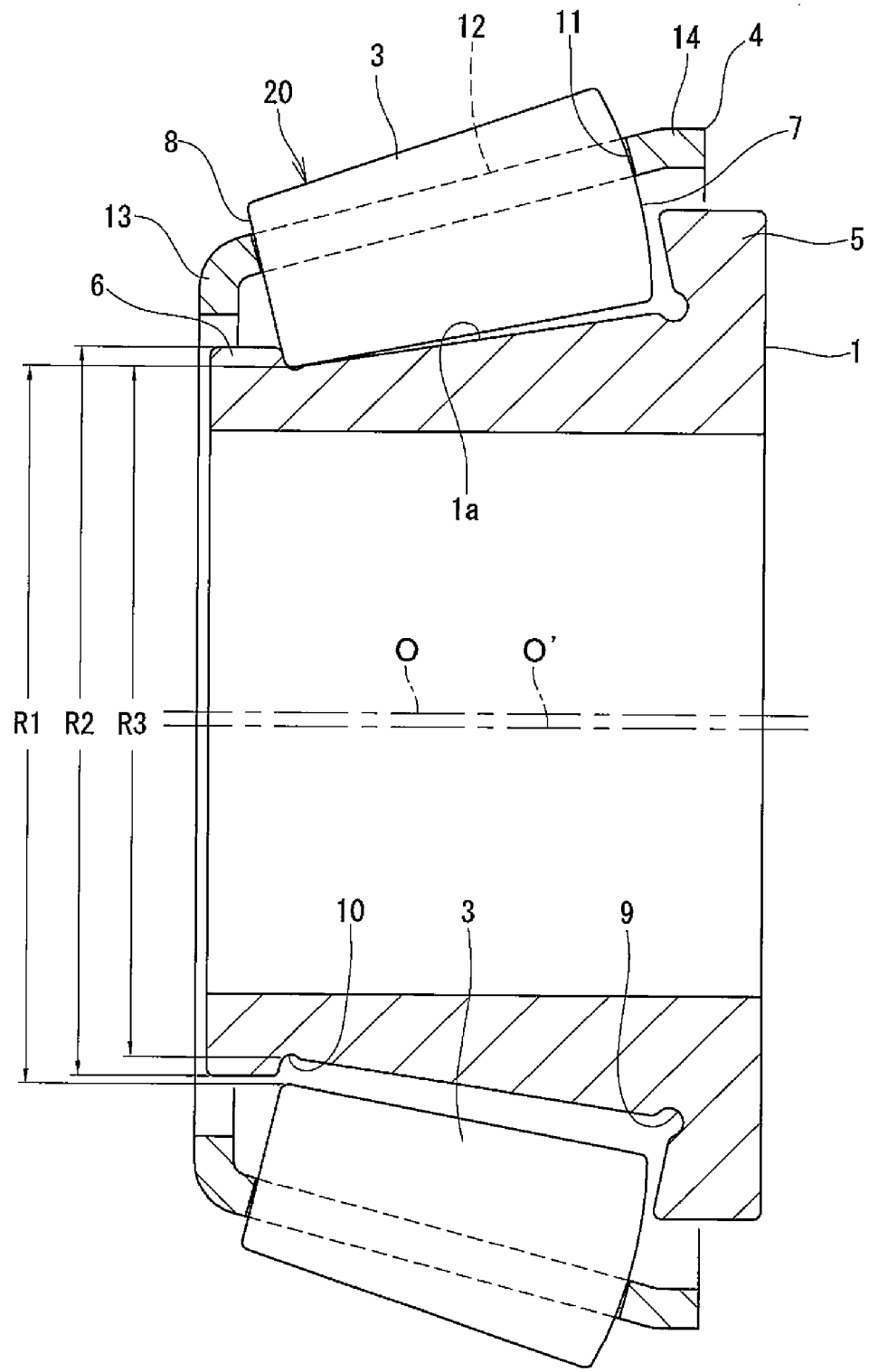
FIG. 3 is a sectional view of a subassembly of tapered rollers, an inner race and a retainer, which is a portion of the tapered roller bearing of FIG. 1 with the outer race removed.
Figure 4:
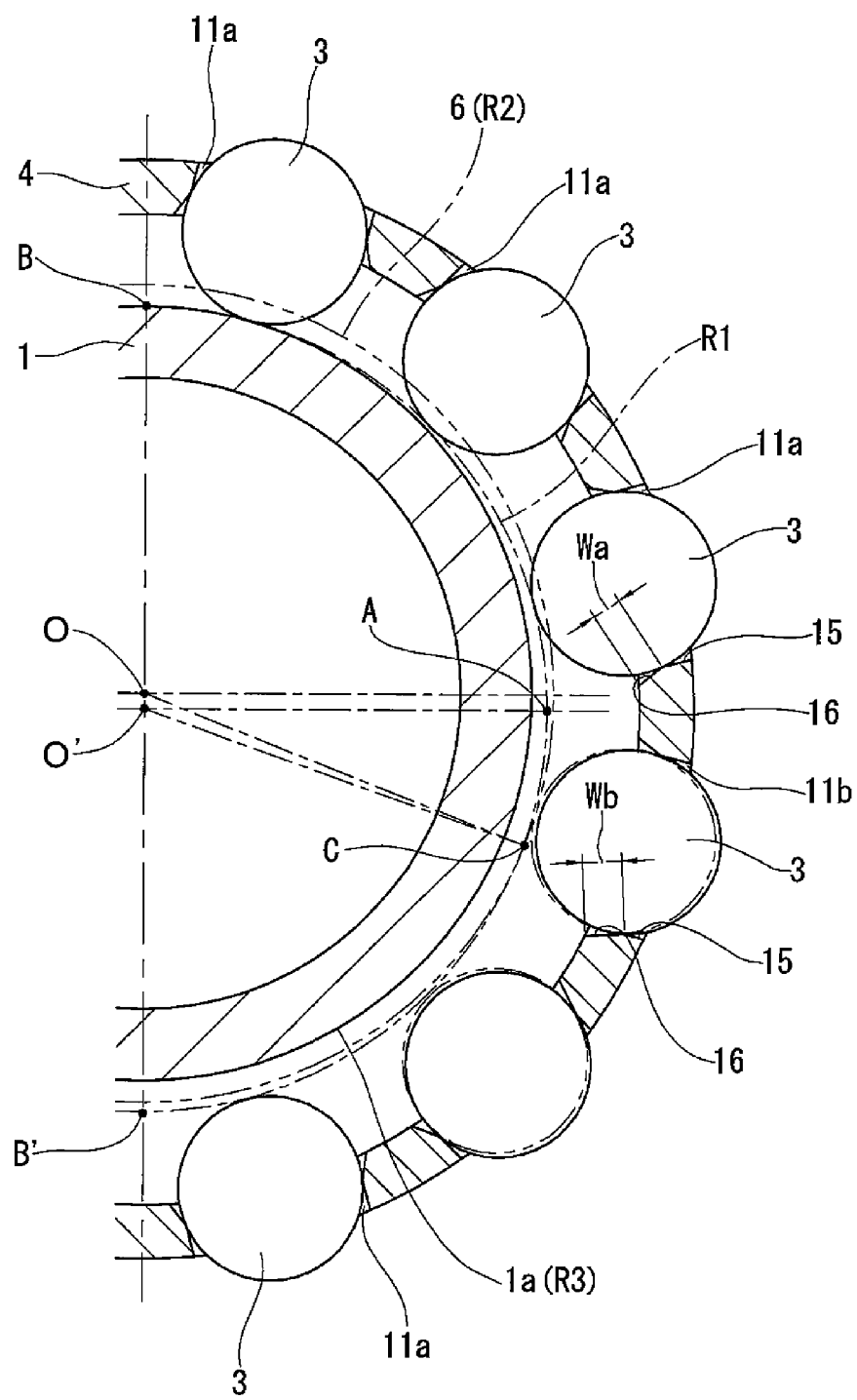
FIG. 4 is a sectional view of the subassembly of FIG. 3, taken along its radial plane.

While there is no outer race 2 as shown in FIGS. 3 and 4, the tapered rollers 2 can move a longer distance in the radially outer direction than when the outer race 2 is mounted in position. The inner race, the retainer and the tapered rollers are configured such that while the tapered rollers 3 are at the radially outermost positions in the respective pockets 11 with the outer race 2 not mounted in position, the roller inscribed circle R1 has a smaller diameter than the outer-diameter surface R2 of the small flange 6. The roller inscribed circle R1 herein used is a circle passing through the contact points between the tapered rollers 3 and an imaginary cylinder inscribed in the respective tapered rollers 3.

Figure 5:
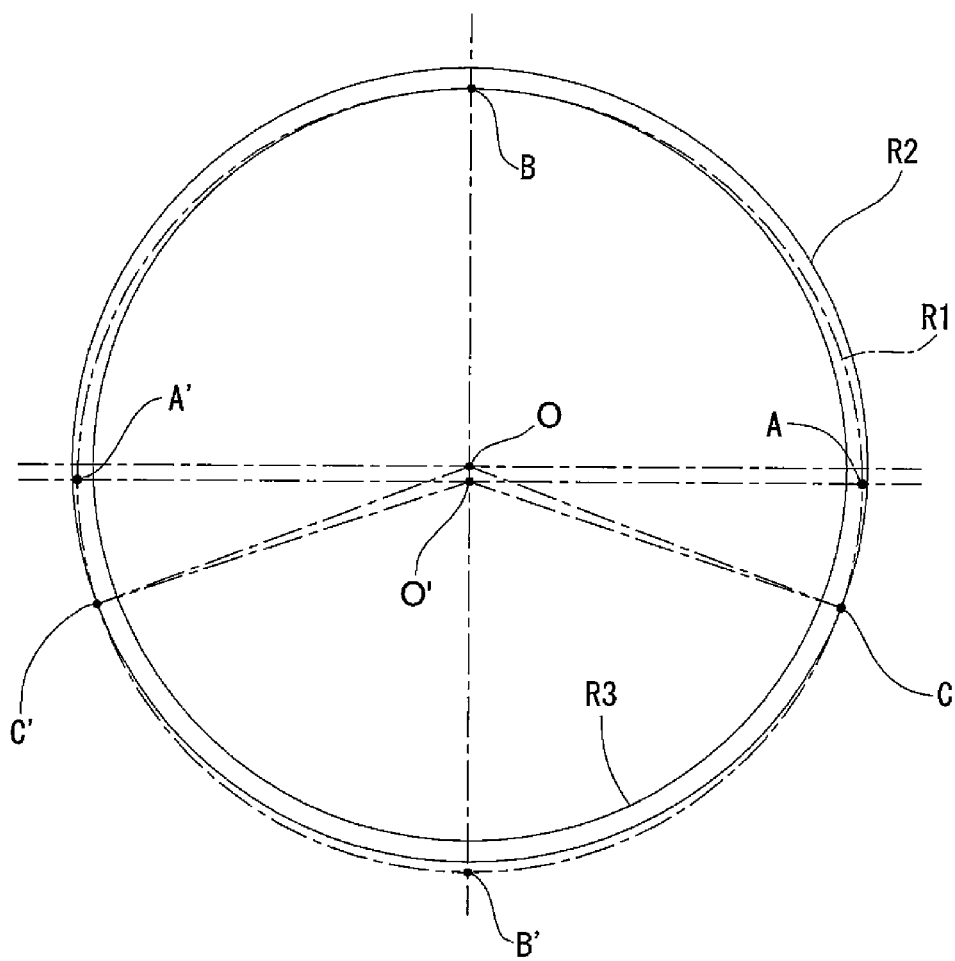
FIG. 5 shows the relationship between a roller inscribed circle R1, a radially outer surface R2 of a small flange of the inner race, and a raceway circle R3 of an end of a raceway of the inner race at the small flange, which are all shown in FIG. 4.

The diameter of the roller inscribed circle R1 is determined such that when the roller inscribed circle R1 is offset from the center of the raceway circle R3 of the end of the raceway 1a at the small flange 6 so as to contact the raceway circle R3 at one point, as shown in FIG. 5, the roller inscribed circle R1 has a first angular range C'B'C protruding radially outwardly from the radially outer surface R2 of the small flange 2, and a second angular range C'BC not protruding radially outwardly form the radially outer surface (R2) of the small flange (2), and having a central angle larger than 180° and not larger than 240°. The raceway circle R3 of the end of the raceway 1a of the inner race 1 at the small flange 6 is the minimum-diameter portion of the imaginary ideal raceway 1a, i.e. the raceway free of the relief groove 10 between the small flange 6 and the raceway 1a.

Figure 6:
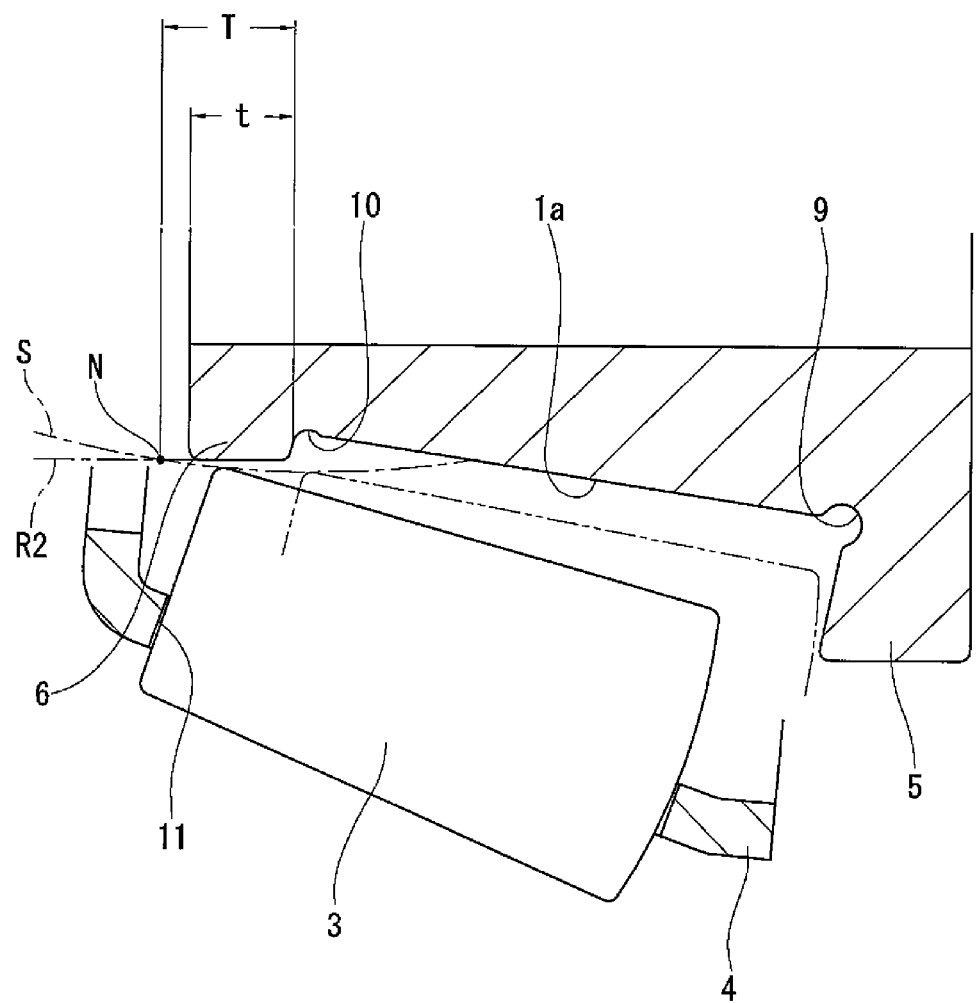
FIG. 6 shows an arcuate locus of a swing end of the roller inscribed circle R1 when the roller inscribed circle is swung toward the small flange of the inner race.

As shown in FIG. 6, the small flange 6 has a thickness t which is not more than the critical thickness T above which the small flange 6 interferes with the arcuate locus S of the swing end of the roller inscribed circle R1 when, with the roller inscribed circle R1 offset from the center of the raceway circle R3 of the end of the raceway 1a at the small flange 6 so as to contact the raceway circle R3 at one point, the roller inscribed circle R1 is swung about the contact point. The critical thickness T is equal to the axial distance from the intersection N between the axial straight line passing through the outer-diameter surface R2 of the small flange 6 and the arcuate locus S of the swing end of the roller inscribed circle R1 to the end of the small flange 6 near the raceway 1a.

As shown in FIG. 4, the plurality of pockets 11 include standard (first) pockets 11a and irregularly shaped (second) pockets 11b. The standard pockets 11a are configured such that the tapered rollers 3 in the respective pockets 11a all correspond to the roller inscribed circle R1 when they are located at the radially outermost positions in the respective pockets 11a with the outer race 2 not mounted (i.e., not mounted about the tapered rollers 3). The irregularly shaped pockets 11b are configured such that the tapered rollers 3 in the respective pockets 11b are radially outwardly displaced from the tapered rollers 3 in the standard pockets 11a when they are located at the radially outermost positions in the respective pockets 11b with the outer race 2 not mounted.

When the roller inscribed circle R1 is offset from the center of the raceway circle R3 of the end of the raceway 1a at the small flange 6 so as to contact the raceway circle R3 at one point (point B in FIG. 4), the irregularly shaped pockets 11b are those positioned angularly spaced apart from this contact point by 90° or more and within the angular range where the roller inscribed circle R1 is located within the outer-diameter surface R2 of the small flange 6 (angular ranges indicated by the central angles A'O'C' and AO'C in FIG. 5).

Figure 7A:
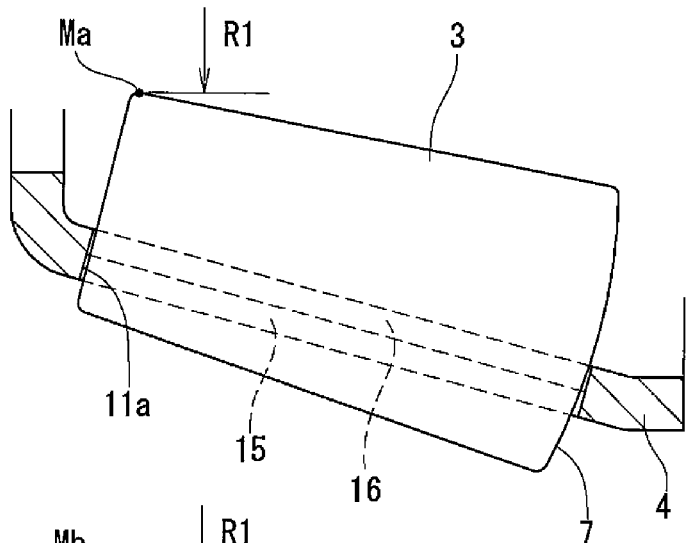
FIG. 7(a) shows the relationship between a standard pocket shown in FIG. 4 and the corresponding tapered roller.
Figure 7B:
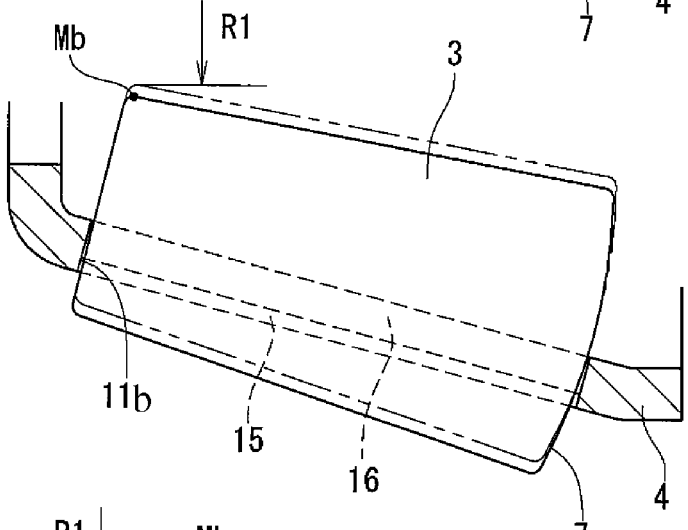
FIG. 7(b) shows the relationship between an irregularly shaped pocket shown in FIG. 4 and the corresponding tapered roller.

The irregularly shaped pockets 11b, which are located in the angular ranges indicated by central angles A'O'C' and AO'C, are formed by pressing their roller guide surfaces 16 for guiding the tapered rollers 3 by larger amounts than the amount by which the roller guide surfaces 16 of the standard pockets 11a are pressed such that the radially innermost portion Mb (see FIG. 7(b)) of the tapered roller 3 received in each of the irregularly shaped pockets 11b is located radially outwardly of the radially innermost portion Ma (see FIG. 7(a)) of the tapered roller 3 received in each of the standard pockets 11a.

As shown in FIG. 4, the roller guide surfaces 16 of the irregularly shaped pockets 11b have a width Wb which is larger than the width Wa of the roller guide surfaces 16 of the standard pockets 11a. In order to smoothly assemble the bearing in the below-described manner, the irregularly shaped pockets 11b are preferably formed such that when the tapered roller 3 in each irregularly shaped pocket 11b is at the radially outermost position with the outer race 2 not mounted, the tapered roller 3 in each irregularly shaped pocket 11b is in contact with or radially outwardly separated from the outer-diameter surface R2 of the small flange 6.

The separately prepared retainer 4, tapered rollers 4, inner race 1 and outer race 2 are assembled into the tapered roller bearing in the below-described manner.

The tapered rollers 3 are inserted into the respective pockets 11 of the retainer 4 from radially inside of the retainer 4. Since the pockets 11 are narrower than the tapered rollers 3, once the tapered rollers 3 are inserted in the respective pockets 11, the tapered rollers never radially outwardly slip out of the retainer 4.

The inner race 1 is then inserted into the retainer 4, with the retainer 4 positioned such that the irregularly shaped pockets 11b are located in the ranges indicated by the central angles A'O'C' and AO'C of FIG. 5, respectively, and with the inner race 1 inclined such that a first end of a diameter of the inner race 1 that corresponds to point B is inserted first and the second end of the diameter, corresponding to point B', is inserted last. After the portion of the small flange 6 of the inner race 1 at the first end of the diameter (corresponding to point B) has passed the roller inscribed circle R1, the portion of the raceway 1a of the inner race 1 which corresponds to point B and has passed the roller inscribed circle is brought into contact with the corresponding tapered roller 3.

The inner race 1 is then swung about the contact point (B) such that the diametrically opposite portion (corresponding to point B') of the inner race 1 is pushed into the retainer 4 until the entire small flange 6 of the inner race 1 passes the roller inscribed circle R1. This completes a subassembly 20 shown in FIGS. 3 and 4 in which the inner race 1, the tapered rollers 3 and the retainer 4 are assembled together. As a final step, the outer race 2 is fitted on the subassembly 20 to complete the tapered roller bearing.

Since the thickness t of the small flange 6 of the inner race 1 is not more than the critical thickness T, when the inner race 1 is swung about the contact point B to push the inner race 1 into the retainer, the swing end of the small flange 6 of the inner race 1 (its portion corresponding to point B') never interferes with any tapered roller 3.

The diameter of the roller inscribed circle R1 is determined such that when the roller inscribed circle R1 is offset from the center of the raceway circle R3 of the end of the raceway 1a at the small flange 6 so as to contact the raceway circle R3 at one point, the portion (arc C'BC) of the roller inscribed circle R1 that is located within the outer-diameter surface R2 of the small flange 6 has a central angle C'OC of 240° or less. With this arrangement, when the inner race 1 is swung about point B to push the inner race 1 into the retainer 4, the small flange 6 of the inner race 1 never or scarcely interferes with the tapered rollers 3. This makes it possible to push the inner race 1 into the retainer 4 by elastically deforming the retainer 4.

Since the diameter of the roller inscribed circle R1 is determined such that the central angle C'OC of the arc C'BC is larger than 180°, once the inner race 1, the tapered rollers 3 and the retainer 4 are assembled into the subassembly 20, the inner race 1 is less likely to separate from the retainer 4. Since the roller inscribed circle R1 is smaller in diameter than the outer-diameter surface R2 of the small flange 6, it is possible to reliably prevent breakup of the subassembly 20.

When the inner race 1 is inserted into the retainer 4 while being inclined such that a first end of a diameter of the inner race 1 that corresponds to point B in FIG. 5 is inserted first and the second end of the diameter, corresponding to point B', is inserted last, the retainer 4 is positioned such that the irregularly shaped pockets 11b are located in the ranges indicated by the central angles A'O'C' and AO'C of FIG. 5, respectively. With this arrangement, the tapered rollers 3 that could otherwise interfere with the small flange 6 of the inner race 1 can be moved radially outwardly, so that the inner race 1 can be smoothly inserted into the retainer 4. Once the inner race is inserted in the retainer 4 to form the subassembly 20, the subassembly 20 is never broken up unless the centers of the retainer 4 and the inner race 1 are displaced in a predetermined direction.

Since this tapered roller bearing can be assembled without the need to radially expand and then caulk the bottom of the retainer, neither a bottom-expanding die nor a caulking die is necessary, which contributes to a reduced manufacturing cost. Since the bottom expanding step and caulking step are dispensed with, the roller guide surfaces 16 of the retainer 4 can be formed with higher dimensional accuracy.

Figure 7C:
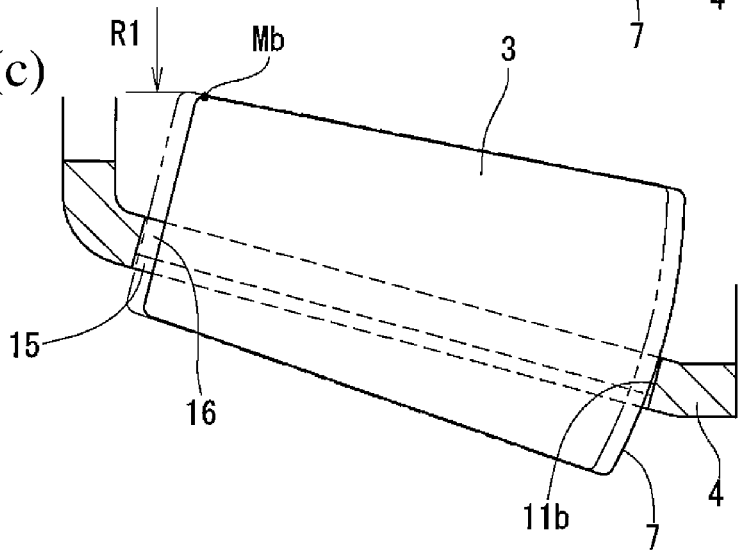
FIG. 7(c) shows a modification of the irregularly shaped pocket of FIG. 7(b).

The irregularly shaped pockets 11b of the above-described embodiment define a larger gap between the roller guide surfaces 16 and the tapered roller 6 than the standard pockets 11a. But instead, as shown in FIG. 7(c), the irregularly shaped pockets 11b may be axially longer toward the large-diameter end surface of the tapered roller 3 than the standard pockets 11a. With this arrangement too, the radially innermost portion Mb of the tapered roller 3 in each irregularly shaped pocket 11b is located radially outwardly of the radially innermost portion Ma (see FIG. 7(a)) of the tapered roller 3 in each standard pocket 11a when the tapered rollers 3 in the respective pockets are at the radially outermost positions with the outer race 2 not mounted.

Figure 8:
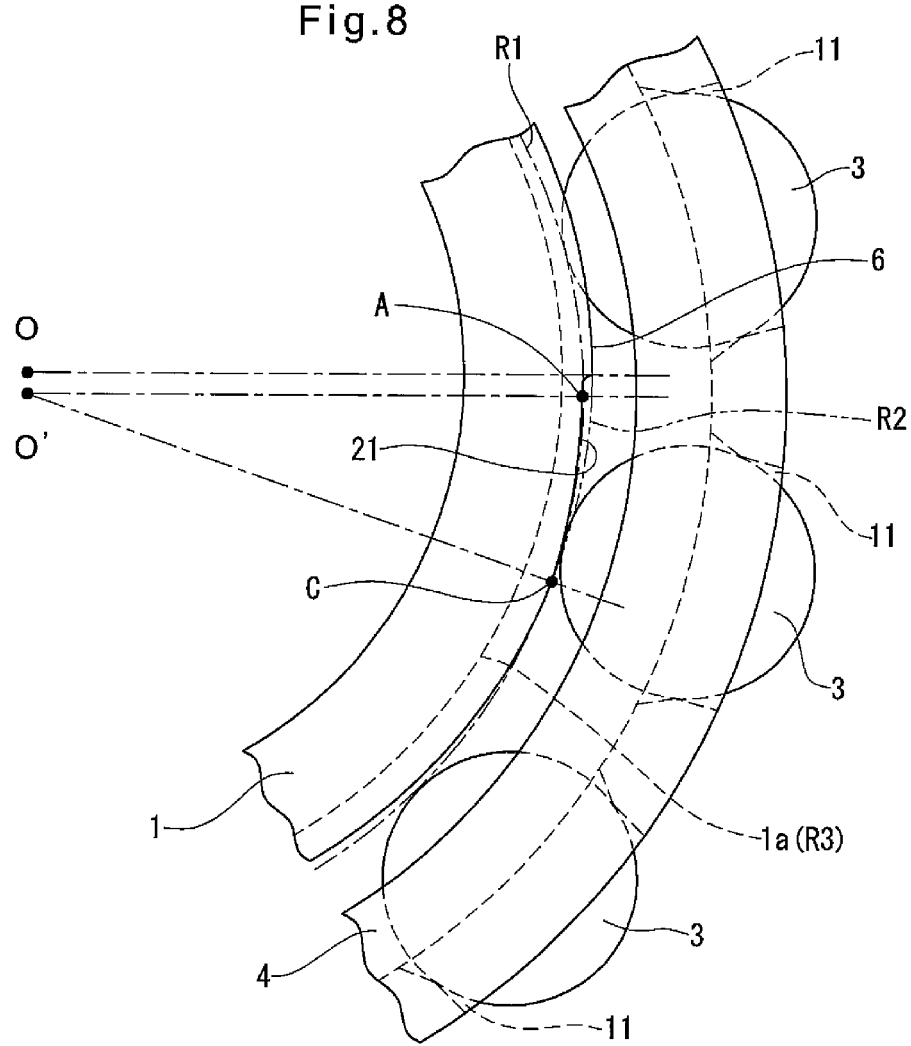
FIG. 8 is an end view of a small flange of an inner race of a tapered roller bearing according to a second embodiment of the present invention.

The tapered roller bearing of the second embodiment is described with reference to FIG. 8. Elements corresponding to those of the first embodiment are denoted by identical numerals and their description is omitted.

The pockets 11 are all standard pockets 11a as defined in the first embodiment, and include no irregularly shaped pockets 11b as defined in the first embodiment.

The radially outer surface of the small flange 6 of the inner race 1 is formed with a cutout 21 extending over an angular range corresponding to the arc AC having a central angle AO'C, and a cutout 21 extending over an angular range corresponding to the arc A'C' having a central angle A'O'C'. (Since the two cutouts are bilaterally symmetrical to each other, the latter cutout 21 is not shown.) As shown, the cutouts 21 coincide with or are located radially inwardly of the roller inscribed circle R1 when the roller inscribed circle R1 is offset from the center of the raceway circle R3 of the end of the raceway 1a at the small flange 6 so as to contact the raceway circle R3 at one point. With this arrangement, the bearing can be assembled smoothly.

The separately prepared retainer 4, tapered rollers 4, inner race 1 and outer race 2 of this embodiment can be assembled into the tapered roller bearing in the same manner as in the first embodiment. In assembling the bearing, with the inner race 1 positioned such that the respective cutouts 21 are located within the angular ranges indicated by the central angles A'O'C' and AO'C shown in FIG. 5, the inner race 1 is inserted into the retainer 4, while being inclined such that a first end of a diameter of the inner race 1 that corresponds to point B is inserted first and the second end of the diameter, corresponding to point B', is inserted last. By inclining the inner race 1 in this way, the portion of the outer periphery of the small flange 6 of the inner race 1 that could otherwise interfere with a tapered roller 3 never interferes with the tapered roller 3. Thus, the inner race 1 can be smoothly inserted into the retainer 4. But once the inner race 1 is inserted into the retainer 4 to complete the subassembly of the inner race 1, retainer 4 and tapered rollers 3, the subassembly is never broken up unless the centers of the retainer 4 and the inner race 1 are displaced in a predetermined direction.

Figure 9A:
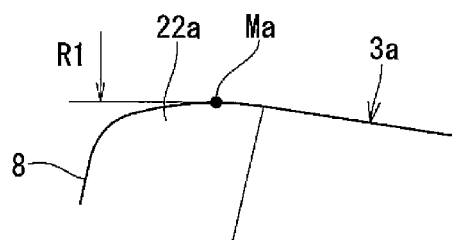
FIG. 9(a) is an enlarged view of a portion of a standard tapered roller of a tapered roller bearing according to a third embodiment of the present invention, including its corner.
Figure 9B:
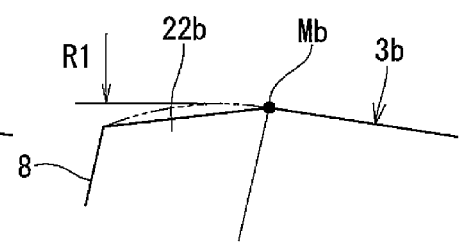
FIG. 9(b) is an enlarged view of a portion of an irregularly shaped tapered roller, including its corner.

Now the tapered roller bearing of the third embodiment is described. The tapered rollers 3 of this embodiment include irregularly shaped (second) tapered rollers 3b (see FIG. 9(b)) which are located in the angular ranges indicated by the central angles A'O'C' and AO'C shown in FIG. 5. The other tapered rollers 3 are standard (first) tapered rollers 3a (see FIG. 9(a)).

The standard tapered rollers 3a are configured to correspond to the roller inscribed circle R1 when the standard tapered rollers 3a are located at the radially outermost positions in the respective pockets 11 with the outer race 2 not mounted. The irregularly shaped rollers 3b are configured such that the radially innermost portions Mb of the irregularly shaped tapered rollers 3b are radially outwardly displaced from the radially innermost portions Ma of the standard tapered rollers 3a when the tapered rollers 3 are located at the radially outermost positions in the respective pockets 11 with the outer race 2 not mounted.

In particular, the irregularly shaped tapered rollers 3b each have its corner 22b at its small-diameter end surface 8 chamfered to a greater degree than the corner 22a of each standard tapered roller 3a at its small-diameter end surface 8 such that the radially innermost portion Mb of the irregularly shaped tapered roller 3b is radially outwardly displaced from the radially innermost portion Ma of the standard tapered roller 3a.

Specifically, the corners 22a of the standard tapered rollers 3a at the small-diameter end surfaces 8 are chamfered so as to have an arcuate section, while the corners 22b of the irregularly shaped tapered rollers 3b at the small-diameter end surfaces 8 are chamfered so as to have a straight section. Thus, the corners 22b of the irregularly shaped tapered rollers 3b are chamfered to a greater degree than the corners 22a of the standard tapered rollers 3a. By simply chamfering the corners 22b of the irregularly shaped tapered rollers 3b so as to be straight in section, the corners 22b can be chamfered to a greater degree than the corners 22a without changing the chamfering width, and thus without reducing the axial length of the rolling surfaces of the irregularly shaped tapered rollers 3b.

The separately prepared retainer 4, tapered rollers 3, inner race 1 and outer race 2 of this embodiment can be assembled into the tapered roller bearing in the same manner as in the first embodiment. In assembling the bearing, with the retainer 4 positioned such that the irregularly shaped tapered rollers 3b are located within the angular ranges indicated by the central angles A'O'C' and AO'C shown in FIG. 5, the inner race 1 is inserted into the retainer 4, while being inclined such that a first end of a diameter of the inner race 1 that corresponds to point B is inserted first and the second end of the diameter, corresponding to point B', is inserted last. By inclining the inner race 1 in this way, the radially innermost portion of the tapered roller 3 that could otherwise interfere with the small flange 6 of the inner race 1 separates radially outwardly from the small flange 6. Thus, the inner race 1 can be smoothly inserted into the retainer 4. But once the inner race 1 is inserted into the retainer 4 to complete the subassembly 20 of the inner race 1, retainer 4 and tapered rollers 3, the subassembly 20 is never broken up unless the centers of the retainer 4 and the inner race 1 are displaced in a predetermined direction.

Figure 10:
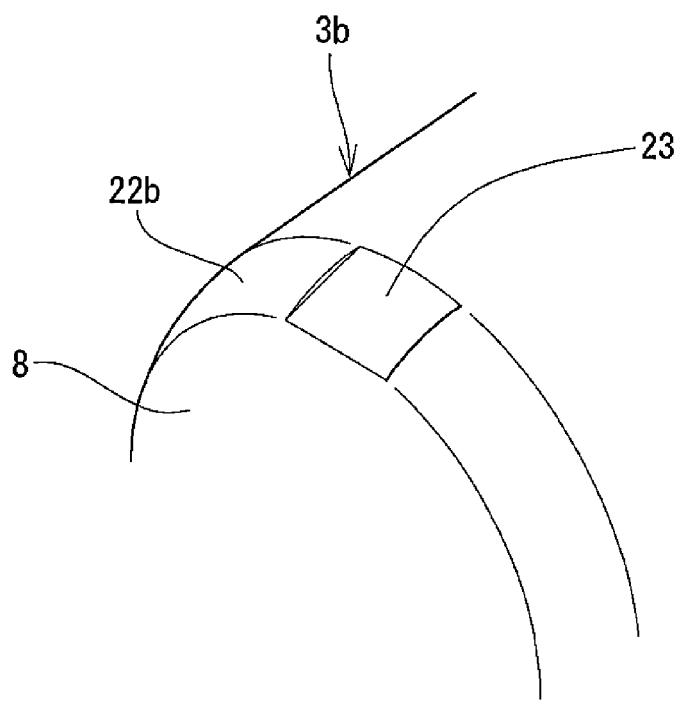
FIG. 10 is an enlarged perspective view of a portion of a modification of the irregularly shaped tapered roller of FIG. 9(b), including its corner.
Figure 11:
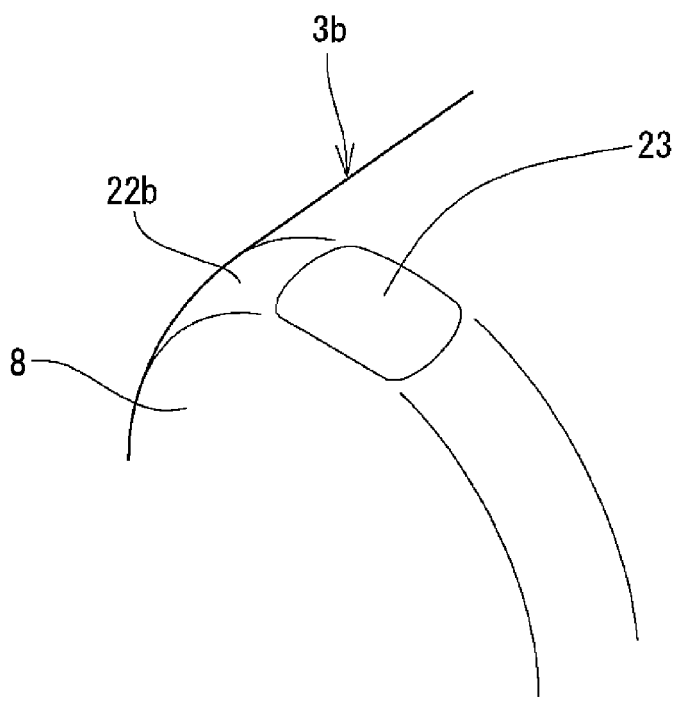
FIG. 11 is an enlarged perspective view of a portion of another modification of the irregularly shaped tapered roller of FIG. 9(b), including its corner.

In this embodiment, the corners 22b of the irregularly shaped tapered rollers 3b at the small-diameter end surfaces 8 are chamfered to a greater degree than the corresponding corners of the standard tapered rollers 3a. But instead, as shown in FIGS. 10 and 11, a cutout 23 may be formed at one circumferential portion of the corner 22b of each irregularly shaped tapered roller 3b, or a plurality of such cutouts 23 may be provided so as to be circumferentially spaced apart from each other. With this arrangement, the radially innermost portions of any of the irregularly shaped tapered rollers 3b cannot move radially outwardly unless the irregularly shaped tapered roller 3b is at such an angular position that the cutout or cutouts 23 are located radially inwardly of the retainer 4. This more reliably prevents breakup of the subassembly 20.

What is claimed is:

1. A tapered roller bearing comprising:
   an inner race (1) having a tapered inner raceway (1a) on an outer periphery of the inner race,
   a plurality of tapered rollers (3) disposed about the inner race (2),
   an outer race (2) disposed about the tapered rollers (3) and having a tapered outer raceway (1b) on an inner periphery of the outer race, such that the tapered rollers (3) are disposed between the tapered inner raceway (1a) and the tapered outer raceway (2a), and such that the tapered rollers (3) are circumferentially spaced apart from each other, and
   a retainer comprising a conical metal plate located radially outwardly of a pitch circle (P) that passes through centers of the respective tapered rollers (3), and formed with circumferentially spaced apart pockets (11) in which the respective tapered rollers (3) are received,
   wherein the pockets (11) have widths smaller than the diameters of the tapered rollers (3), whereby the tapered rollers (3) could not separate radially outwardly from the retainer (4) even if the outer race (2) was not mounted in position about the tapered rollers, and
   wherein the inner race (1) includes a large flange (5) and a small flange (6) at a large-diameter end and a small-diameter end of the tapered inner raceway (1a), respectively,
   wherein the inner race (1), the tapered rollers (3), and the retainer (4) are configured such that, when the outer race (2) is not mounted in position about the tapered rollers (3):
      a roller inscribed circle (R1) is defined as a circle inscribed within the plurality of tapered rollers (3) if the tapered rollers (3) were at radially outermost positions in the respective pockets (11),
      a raceway circle (R3) of the tapered inner raceway (1a) is defined as a circle that is coaxial and coextensive with the tapered inner raceway (1a) adjacent the small flange (6),
      the roller inscribed circle (R1) has a diameter smaller than the diameter of a radially outer surface (R2) of the small flange (6),
      the roller inscribed circle (R1) has a first angular range (C'B'C) in which the roller inscribed circle (R1) would protrude radially outwardly from the radially outer surface (R2) of the small flange (2), and a second angular range (C'BC) in which the roller inscribed circle (R1) would not protrude radially outwardly from the radially outer surface (R2) of the small flange (2), if the roller inscribed circle (R1) was offset from the center of the raceway circle (R3) of the tapered inner raceway (1a) at the small-diameter end of the tapered inner raceway (1a) so as to contact the raceway circle (R3) at one point (B), wherein the second angular range (C'BC) has a central angle larger than 180° and not larger than 240°, and
      the small flange (6) of the inner race (1) has such a thickness (t) that, if the roller inscribed circle (R1) was offset from the center of the raceway circle (R3) so as to contact the raceway circle (R3) at the one point (B), the roller inscribed circle (R1) could be swung about the one point (B) toward the small flange (6) without the small flange (6) interfering with an arcuate locus (S) of a swing end of the roller inscribed circle (R1),
   wherein the tapered rollers (3) comprise first tapered rollers and second tapered rollers,
   wherein the plurality of pockets (11) comprise
      first pockets (11a) in which the respective first tapered rollers are received, and which are configured such that, if the first rollers were at the radially outermost positions in the respective standard pockets (11a), radially innermost portions (Mb) of the first tapered rollers would coincide with the roller inscribed circle (R1), and
      second pockets (11b) in which the respective second tapered rollers are received, and which are configured such that, if the tapered rollers were at the radially outermost positions in the respective pockets (11), radially innermost portions (Mb) of the second tapered rollers would be radially outwardly displaced from the first tapered rollers, and
   wherein the inner race (1), the tapered rollers (3), and the retainer (4) are configured such that, if the roller inscribed circle (R1) was offset from the center of the raceway circle (R3) at the small-diameter end of the tapered inner raceway (1a) so as to contact the raceway circle (R3) at the one point (B), the second pockets (11b) would be located within angular ranges which are angularly spaced from the one point (B) by 90° or over and within the second angular range.

2. The tapered roller bearing of claim 1, wherein the pockets (11) each have roller guide surfaces (16), and wherein a larger gap is defined between the roller guide surfaces (16) of each of the second pockets (11b) and the corresponding tapered roller (3) than between the roller guide surfaces (16) of each of the first pockets (11a) and the corresponding tapered roller (3).

3. The tapered roller bearing of claim 1, wherein the second pockets (11b) are axially longer toward the large-diameter end surface (7) of the tapered roller (3) than the first pockets (11a).

4. A tapered roller bearing comprising:
an inner race (1) having a tapered inner raceway (1a) on an outer periphery of the inner race,
a plurality of tapered rollers (3) disposed about the inner race (2),
an outer race (2) disposed about the tapered rollers (3) and having a tapered outer raceway (1b) on an inner periphery of the outer race, such that the tapered rollers (3) are disposed between the tapered inner raceway (1a) and the tapered outer raceway (2a), and such that the tapered rollers (3) are circumferentially spaced apart from each other, and
a retainer comprising a conical metal plate located radially outwardly of a pitch circle (P) that passes through centers of the respective tapered rollers (3), and formed with circumferentially spaced apart pockets (11) in which the respective tapered rollers (3) are received,
wherein the pockets (11) have widths smaller than the diameters of the tapered rollers (3), whereby the tapered rollers (3) could not separate radially outwardly from the retainer (4) even if the outer race (2) was not mounted in position about the tapered rollers, and
wherein the inner race (1) includes a large flange (5) and a small flange (6) at a large-diameter end and a small-diameter end of the tapered inner raceway (1a), respectively,
wherein the inner race (1), the tapered rollers (3), and the retainer (4) are configured such that, when the outer race (2) is not mounted in position about the tapered rollers (3):
a roller inscribed circle (R1) is defined as a circle inscribed within the plurality of tapered rollers (3) if the tapered rollers (3) were at radially outermost positions in the respective pockets (11),
a raceway circle (R3) of the tapered inner raceway (1a) is defined as a circle that is coaxial and coextensive with the tapered inner raceway (1a) adjacent the small flange (6),
the roller inscribed circle (R1) has a diameter smaller than the diameter of a radially outer surface (R2) of the small flange (6),
the roller inscribed circle (R1) has a first angular range (C'B'C) in which the roller inscribed circle (R1) would protrude radially outwardly from the radially outer surface (R2) of the small flange (2), and a second angular range (C'BC) in which the roller inscribed circle (R1) would not protrude radially outwardly from the radially outer surface (R2) of the small flange (2), if the roller inscribed circle (R1) was offset from the center of the raceway circle (R3) of the tapered inner raceway (1a) at the small-diameter end of the tapered inner raceway (1a) so as to contact the raceway circle (R3) at one point (B), wherein the second angular range (C'BC) has a central angle larger than 180° and not larger than 240°, and the small flange (6) of the inner race (1) has such a thickness (t) that, if the roller inscribed circle (R1) was offset from the center of the raceway circle (R3) so as to contact the raceway circle (R3) at the one point (B) with the outer race (2) not mounted in position about the tapered rollers (3), the roller inscribed circle (R1) could be swung about the one point (B) toward the small flange (6) without the small flange (6) interfering with an arcuate locus (S) of a swing end of the roller inscribed circle (R1),
wherein the radially outer surface (R2) of the small flange (6) of the inner race (1) is formed with cutouts (21) extending over arcuate angular ranges (AC), respectively, said cutouts (21) being configured such that the cutouts (21) are angularly spaced from the one point (B) by 90° or more and within the second angular range (C'BC).

5. A tapered roller bearing comprising:
an inner race (1) having a tapered inner raceway (1a) on an outer periphery of the inner race,
a plurality of tapered rollers (3) disposed about the inner race (2),
an outer race (2) disposed about the tapered rollers (3) and having a tapered outer raceway (1b) on an inner periphery of the outer race, such that the tapered rollers (3) are disposed between the tapered inner raceway (1a) and the tapered outer raceway (2a), and such that the tapered rollers (3) are circumferentially spaced apart from each other, and
a retainer comprising a conical metal plate located radially outwardly of a pitch circle (P) that passes through centers of the respective tapered rollers (3), and formed with circumferentially spaced apart pockets (11) in which the respective tapered rollers (3) are received,
wherein the pockets (11) have widths smaller than the diameters of the tapered rollers (3), whereby the tapered rollers (3) could not separate radially outwardly from the retainer (4) even if the outer race (2) was not mounted in position about the tapered rollers, and
wherein the inner race (1) includes a large flange (5) and a small flange (6) at a large-diameter end and a small-diameter end of the tapered inner raceway (1a), respectively,
wherein the inner race (1), the tapered rollers (3), and the retainer (4) are configured such that, when the outer race (2) is not mounted in position about the tapered rollers (3):
a roller inscribed circle (R1) is defined as a circle inscribed within the plurality of tapered rollers (3) if the tapered rollers (3) were at radially outermost positions in the respective pockets (11),
a raceway circle (R3) of the tapered inner raceway (1a) is defined as a circle that is coaxial and coextensive with the tapered inner raceway (1a) adjacent the small flange (6),
the roller inscribed circle (R1) has a diameter smaller than the diameter of a radially outer surface (R2) of the small flange (6),
the roller inscribed circle (R1) has a first angular range (C'B'C) in which the roller inscribed circle (R1) would protrude radially outwardly from the radially outer surface (R2) of the small flange (2), and a second angular range (C'BC) in which the roller inscribed circle (R1) would not protrude radially outwardly from the radially outer surface (R2) of the small flange (2), if the roller inscribed circle (R1) was offset from the center of the raceway circle (R3) of the tapered inner raceway (1a) at the small-diameter end of the tapered inner raceway (1a) so as to contact the raceway circle (R3) at one point (B), wherein the second angular range (C'BC) has a central angle larger than 180° and not larger than 240°, and the small flange (6) of the inner race (1) has such a thickness (t) that, if the roller inscribed circle (R1) was offset from the center of the raceway circle (R3) so as to contact the raceway circle (R3) at the one point (B) with the outer race (2) not mounted in position about the tapered rollers (3), the roller inscribed circle (R1) could be swung about the one point (B) toward the small flange (6) without the small flange (6) interfering with an arcuate locus (S) of a swing end of the roller inscribed circle (R1), wherein the plurality of tapered rollers (3) comprise first tapered rollers (3a) configured such that radially innermost portions (Ma) of the first tapered rollers (3a) would coincide with the roller inscribed circle (R1) if the first tapered rollers (3a) were at the radially outermost positions in the respective pockets (11), and second rollers (3b) configured such that radially innermost portions (Mb) of the respective second rollers (3b) would be radially outwardly displaced from the roller inscribed circle (R1) if the tapered rollers (3) were at the radially outermost positions in the respective pockets (11), and wherein the inner race (1), the tapered rollers (3), and the retainer (4) are configured such that, if the roller inscribed circle (R1) was offset from the center of the raceway circle (R3) at the small-diameter end of the tapered inner raceway (1a) so as to contact the raceway circle (R3) at the one point (B), the second tapered rollers (3b) would be located within angular ranges which are angularly spaced from the one point (B) by 90° or more and within the second angular range (C'BC).

6. The tapered roller bearing of claim 5, wherein the tapered rollers (3) have small-diameter end surfaces (8), large-diameter end surfaces (7), and chamfered corners at the small-diameter end surfaces (8), respectively, the chamfered corners (22b) of the second tapered rollers (3b) are chamfered to a greater degree than the chamfered corners of the first tapered rollers (3a).

7. The tapered roller bearing of claim 5, wherein the second tapered rollers (3b) each have a corner (22b) at the small-diameter end surface (8), and wherein the corner (22b) is formed with one cutout (23) at one circumferential portion of the corner (22b) or with a plurality of circumferentially spaced apart cutouts (23).

* * * * *